(12) United States Patent
Biran et al.

(10) Patent No.: US 7,383,312 B2
(45) Date of Patent: Jun. 3, 2008

(54) APPLICATION AND VERB RESOURCE MANAGEMENT

(75) Inventors: Giora Biran, Zichron Ya'akov (IL); Zorik Machulsky, Naharia (IL); Vadim Makhervaks, Yokneam (IL); Leah Shalev, Zichron Ya'akov (IL)

(73) Assignee: International Business Machines Corporation, Armonk, NY (US)

( * ) Notice: Subject to any disclaimer, the term of this patent is extended or adjusted under 35 U.S.C. 154(b) by 813 days.

(21) Appl. No.: 10/747,433

(22) Filed: Dec. 29, 2003

(65) Prior Publication Data

US 2005/0149623 A1 Jul. 7, 2005

(51) Int. Cl.
*G06F 15/167* (2006.01)
*G06F 13/28* (2006.01)
*H04L 12/28* (2006.01)

(52) U.S. Cl. .................. 709/212; 710/22; 370/412

(58) Field of Classification Search ............... 709/212, 709/250; 710/22, 23; 370/412
See application file for complete search history.

(56) References Cited

U.S. PATENT DOCUMENTS

| 6,718,370 | B1 * | 4/2004 | Coffman et al. ............. 709/212 |
| 6,901,463 | B2 * | 5/2005 | Jay et al. ....................... 710/52 |
| 7,116,673 | B2 * | 10/2006 | Kashyap et al. ............. 370/412 |
| 2004/0034725 | A1 * | 2/2004 | Elzur .......................... 710/22 |
| 2004/0085984 | A1 * | 5/2004 | Elzur .......................... 370/412 |
| 2004/0136325 | A1 * | 7/2004 | Dobric et al. ............... 370/241 |
| 2005/0117430 | A1 * | 6/2005 | Makhervaks et al. ....... 365/222 |

* cited by examiner

*Primary Examiner*—William Vaughn
*Assistant Examiner*—Yemane Mesfin

(57) ABSTRACT

A method for controlling access to computer memory, the method including communicating work queue elements with an application layer and with a verb layer, and indicating completion of the work queue elements, wherein both the application layer and the verb layer are capable of checking if at least one of the work queue elements is completed, independently of each other.

4 Claims, 3 Drawing Sheets

APPLICATION AND VERB RESOURCE MANAGEMENT

FIELD OF THE INVENTION

The present invention relates generally to application and verb resource management in systems that use Remote Direct Memory Access (RDMA) protocol.

BACKGROUND OF THE INVENTION

Remote Direct Memory Access (RDMA) is a technique for efficient movement of data over high-speed transports. RDMA enables a computer to directly place information in another computer's memory with minimal demands on memory bus bandwidth and CPU processing overhead, while preserving memory protection semantics. It facilitates data movement via direct memory access by hardware, yielding faster transfers of data over a network while reducing host CPU overhead.

Different forms of RDMA are known and used (all of which are referred to herein as RDMA), such as but not limited to, VIA (Virtual Interface Architecture), InfiniBand, iWARP and RNIC. In simplistic terms, VIA specifies RDMA capabilities without specifying underlying transport. InfiniBand specifies an underlying transport and a physical layer. RDMA over TCP/IP (transport control protocol/Internet protocol) specifies an RDMA layer that interoperates over a standard TCP/IP transport layer. RDMA over TCP does not specify a physical layer; and works over Ethernet, wide area networks (WAN) or any other network where TCP/IP is used. RNIC is an RDMA-enabled NIC (Network Interface Controller). The RNIC provides support for the RDMA over TCP and can include a combination of TCP offload and RDMA functions in the same network adapter.

RDMA protocols allow a direct access to the application buffers. Hardware interfaces with software using so-called Work Queues (WQ). Work queues are created in pairs, called a Queue Pair (QP), one for send operations (Send Queue) and one for receive operations (Receive Queue). The send work queue (SWQ) holds instructions that cause data to be transferred between one consumer's memory and another consumer's memory, and the receive work queue (RWQ) holds instructions about where to place data that is received from another consumer. The consumer submits a work request, which a Work Queue Element (WQE) to be placed on the appropriate work queue. A channel adapter executes WQEs in the order that they were placed on the work queue.

The abovementioned queues are managed by a so-called verb layer. This layer is a software library residing in the consumer memory space, and providing different RDMA services, like post send and receive request.

Application (wherein the term application encompasses, but is not limited to, user and kernel space; the term "consumer" is also used to denote "application") posts its buffers for RDMA NIC processing using PostSend/PostRecv verbs. Once the buffers are posted by an application, ownership of the buffers passes to the RDMA NIC. An application is prohibited from accessing the buffers after they have been posted for RDMA processing. Application buffers remain in RDMA NIC possession till RDMA NIC completes their processing (finishes sending the data posted in those buffers, or receives the data destined for those buffers). RDMA NIC provides a way for an application to query for completed requests, herein referred to as a PollCompletion verb.

The prior art has different approaches to the problem of managing application buffers posted via Work Requests (WR) and verb resources (WQs).

Once the RDMA NIC has completed processing the posted WR, the application buffers consumed by this request can be reused by an application and WQEs can be reused by the verb layer.

An application uses PollCompletion verb to query the next completed WR (if any), and given information provided by this verb, the application can manage the buffers consumed by this WR. The decisions how to manage the buffers and when to query for completion of posted requests depend upon the application.

Not every posted request requires report of its completion. It is up to the application to select requests requiring completion report, so-called signaled requests.

There are several completion-reporting mechanisms used in the prior art, two basic ones being described with reference to FIGS. 1A-2B.

Reference is now made to FIGS. 1A and 1B, which illustrate a Write-back Status Approach used in the prior art to report completion of a WR.

As shown in FIG. 1A, a PostSend verb uses a send queue element SQE 10 for a send WR, and a PostReceive verb uses a receive queue element RQE 12 for a receive WR. When a WR is completed, an indication of the WR completion is written in a status field 14 of the WQE (i.e., SQE 10 or RQE 12). A PollCompletion verb is used to query the status field 14 of the WQE to found out if the corresponding WR is completed. Update of the status field in the WQE not only indicates completion of the consumer WR, but also indicates that this WQE can be reused by the verb layer.

It is noted that the PostSend/PostRecv and PollCompletion verbs all operate on the same WQ structure. The same status field 14 of the WQE is used for management of the application layer and the verb layer resources.

As shown in FIG. 1B, the verb layer can reuse a particular WQE only after the application layer has been informed that the status field of that WQE is checked as completed.

The Write-back Status Approach for querying completed requests by the application assumes use of the same data structure for posting new requests, deallocation of completed WQEs, and query on completed requests. In this approach, the application manages its own and verb layer resources.

Reference is now made to FIGS. 2A and 2B, which illustrate a Completion Queue Approach used in the prior art to report completion of a WR. For example, protocols like InfiniBand and iWARP use a completion queue approach. This approach introduces a new term of completion queue (CQ), wherein each entry of such a queue describes a single signaled WR that has been completed.

When the channel adapter completes a WR, a Completion Queue Element (CQE) 16 is placed on the CQ. Each CQE 16 specifies all the information necessary for a work completion, and either contains that information directly or points to other structures, for example, the associated WQE, that contain the information. In this approach, the PollCompletion verb is used to query the CQE 16 to found out if a particular WQE is now available.

As shown in FIG. 2B, the verb layer can reuse a particular WQE only after the application layer has queried the CQE 16 and been informed that the corresponding WR is completed.

This method allows much more flexible mechanism for managing of application resources:

a. sharing of the same completion queue between different WQs
b. use a different data structures to post requests, and poll for completions A disadvantage of this approach is that the release of WQEs is done again upon poll for completion. This forces the application protocol from time to time to post signaled WQEs to the CQE 16 allow WQE deallocation, even if their completion is not important from the protocol perspective. Another disadvantage is that the WQ address space must be accessible by the PollCompletion verb, and the CQ and QP must reside in the same memory space. Another disadvantage is the need to synchronize between PollCompletion and PostSend execution. For example, since PostSend consumes WQEs and PollCompletion releases WQEs, the update of the total number of WQEs needs to be synchronized.

SUMMARY OF THE INVENTION

The present invention seeks to provide improved methods for application and verb resource management in systems that use RDMA protocol. As described hereinbelow, the present invention may decouple the verb resource management from the application management.

BRIEF DESCRIPTION OF THE DRAWINGS

The present invention will be understood and appreciated more fully from the following detailed description taken in conjunction with the appended drawings in which.

DETAILED DESCRIPTION OF EMBODIMENTS

Figure 1A:
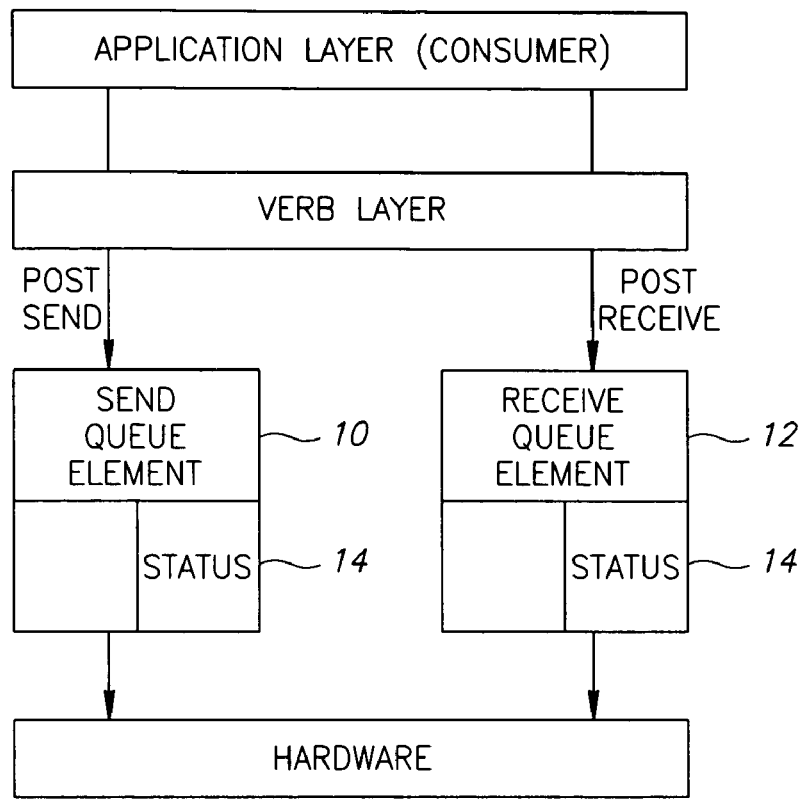
FIGS. 1A and 1B are simplified illustrations of a Writeback Status Approach used in the prior art to report completion of a WR.
Figure 1B:
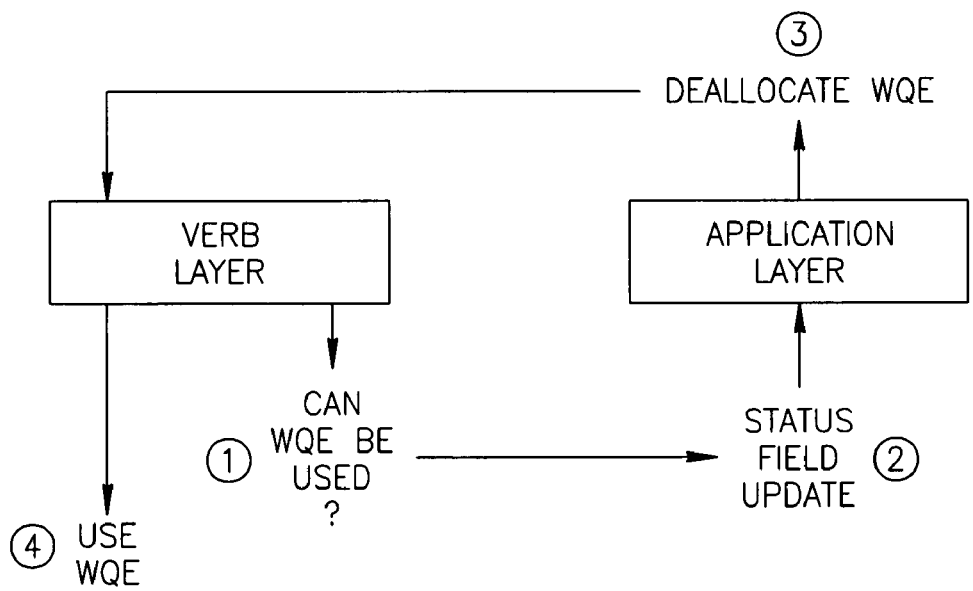
Figure 2A:
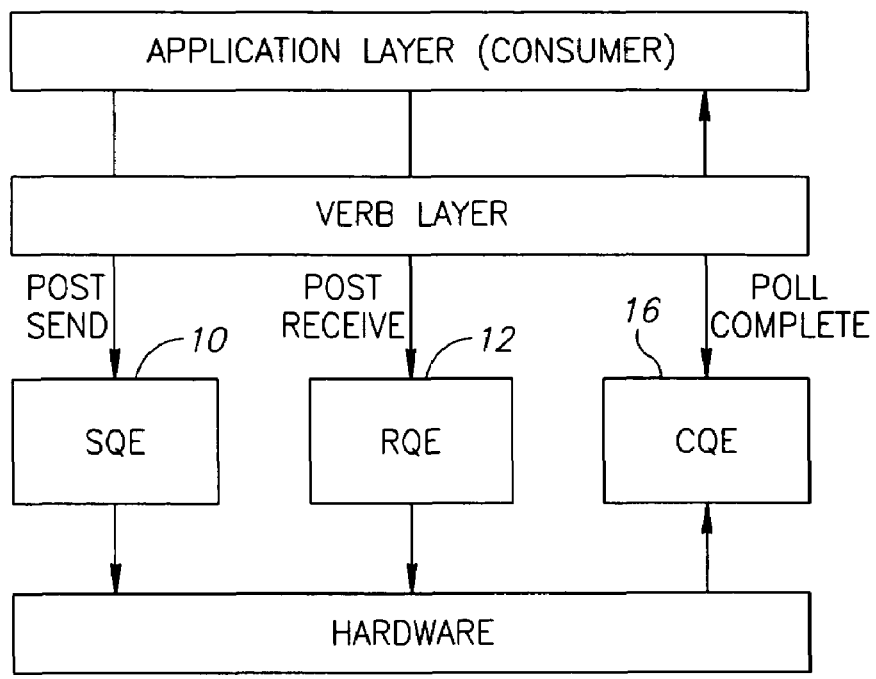
FIGS. 2A and 2B are simplified illustrations of a Completion Queue Approach used in the prior art to report completion of a WR.
Figure 2B:
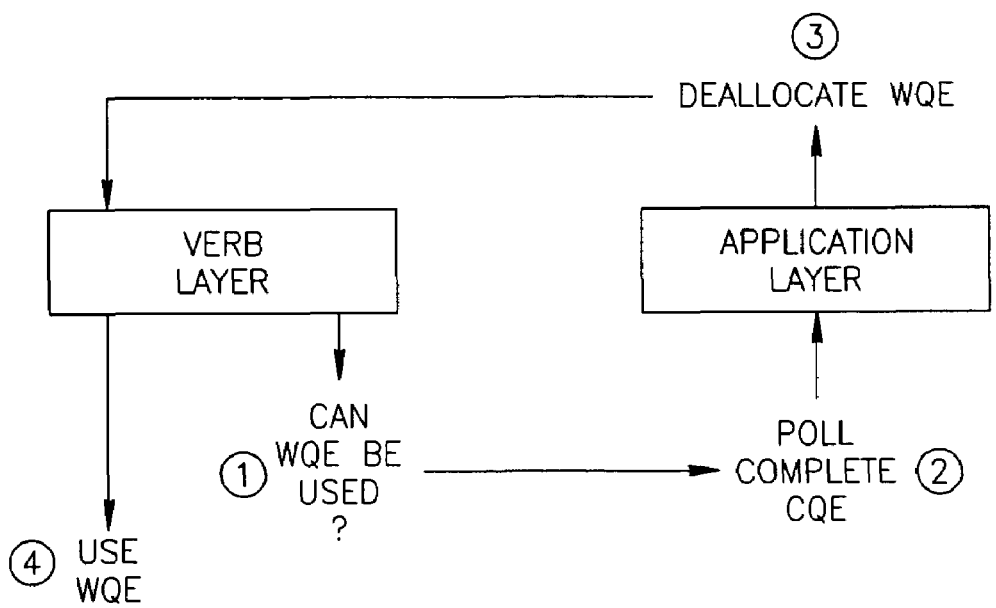
Figure 3A:
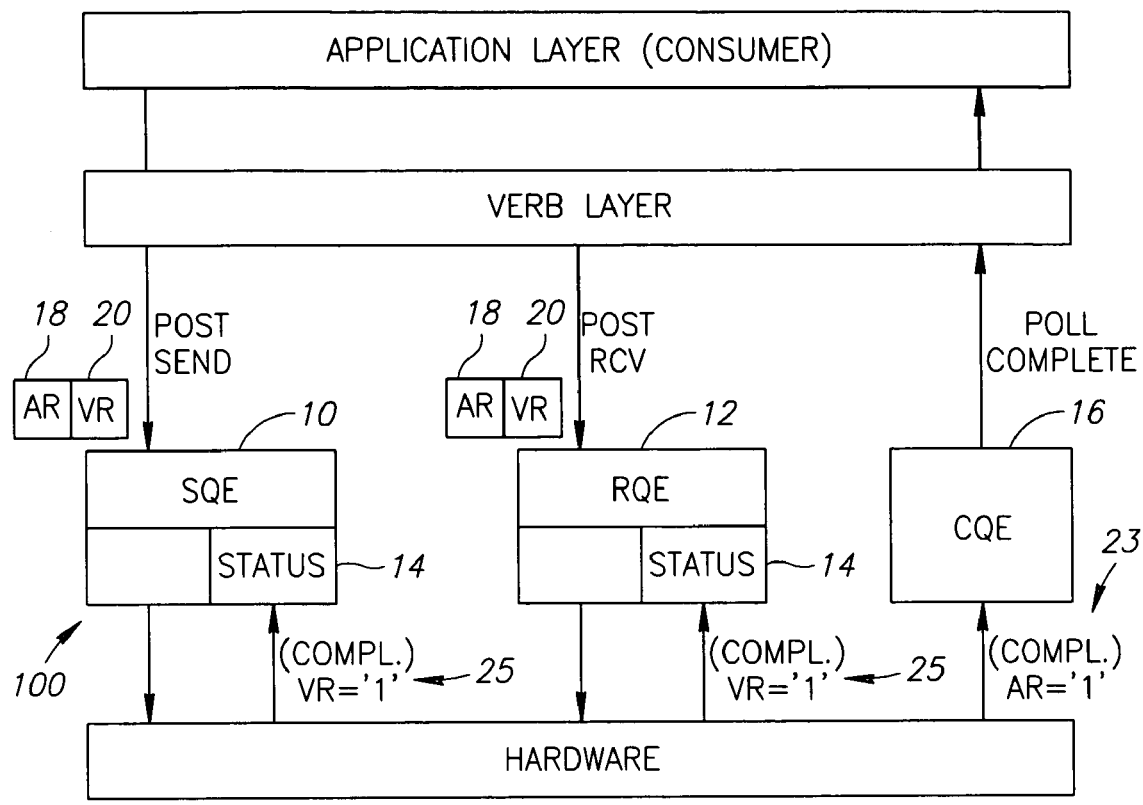
FIGS. 3A and 3B are simplified illustrations of a method for application and verb resource management in accordance with an embodiment of the present invention.
Figure 3B:
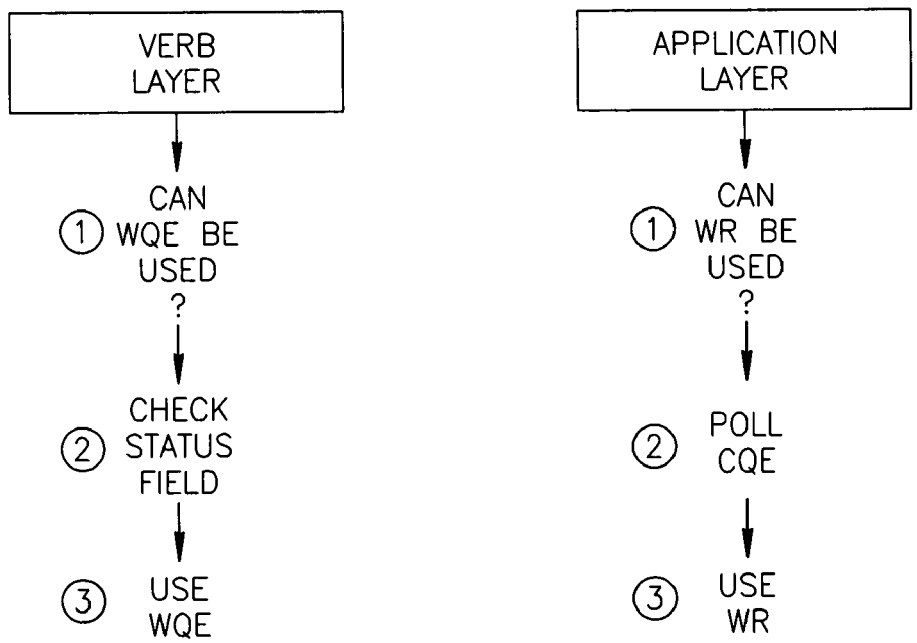

Reference is now made to FIGS. 3A and 3B, which illustrate a method for application and verb resource management in accordance with an embodiment of the present invention. The present invention may be used in a system 100 that uses RDMA protocol, such as but not limited to, RNIC.

As shown in FIG. 3A, a PostSend verb may use a send queue element SQE 10 for a post send WR, and a PostReceive verb may use a receive queue element RQE 12 for a post receive WR. Each posted request may comprise two bits. One bit, called an application request bit 18, may indicate an application request for completion notification. Another bit, called a verb request bit 20, may indicate a verb request for completion notification.

When the RDMA completes processing the posted request, it may check both the application request bit 18 and the verb request bit 20. If the application request bit 18 is set (e.g., equals a logical '1'), then the RDMA may add a CQE 16 to the corresponding completion queue, indicating that that particular WR is completed (as indicated by arrow 23 in FIG. 3A). The application may query this CQE 16 using a PollCompletion verb to find out if the particular WR is completed. This verb may retrieve an available CQE without any additional processing of the WQ, and may provide the application with sufficient information to manage the application buffers.

If the verb request bit 20 is set (e.g., equals a logical '1'), then the RDMA may update the WQE status field 14 of the particular SQE 10 or RQE 12, thereby indicating that the particular WQE has been completed (as indicated by arrows 25 in FIG. 3A). When the verb layer is requested to post a new request, it may check the WQE status field 14 of a particular WQE to found if the particular WQE is completed and is thus available for further use.

The method of the present invention may thus decouple management of verb resources from the management of application resources, and may enable efficient and flexible management of both the application and verb resources.

As shown in FIG. 3B, the application layer may decide when and why it wants to get an indication that particular WR has been completed. In other words, the application may decide when it needs to query completion information by using a PollCompletion verb to find out if the particular WR is completed. The application may share a common completion queue between several WQs, to simplify application resource management. None of those application decisions has any influence on the verb resources management. This method permits WQ and CQ to be located in different address spaces, not necessarily accessible one from another.

Independently of the application layer, the verb layer may decide when and why it wants to get an indication that particular WQE has been completed, by checking the status field 14 in a particular WQE. The WQ and CQ do not necessarily have to be in the same memory space, and do not necessarily have to be accessible by common software components.

It is noted that the methods shown in FIGS. 3A and 3B and described hereinabove, may be carried out by a computer program product, such as but not limited to, Network Interface Card (NIC), Host Bus Adapter (HBA), a floppy disk, hard disk, optical disk, memory device and the like, which may include instructions for carrying out the methods described hereinabove.

The description of the present invention has been presented for purposes of illustration and description, and is not intended to be exhaustive or limited to the invention in the form disclosed. Modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for controlling access to computer memory, the method comprising:

communicating work queue elements with an application layer and with a verb layer, wherein the application layer or the verb layer requests a completion notification to determine whether a work queue element has been completed; and indicating completion of said work queue elements, in response to either the application layer or the verb layer requesting completion notification, wherein both the application layer and the verb layer are capable of checking if at least one of said work queue elements is completed, independently of each other, such that the application layer does not interface with the verb layer to determine completion status of the work queue elements,
wherein communicating work queue elements comprises communicating a consumer work request comprising an application request bit, adapted to indicate an application request for completion notification, and a verb request bit, adapted to indicate a verb request for completion notification,
wherein if the application request bit is set, then a completion queue element is provided that indicates completion of the communicated consumer work request and if the verb request bit is set, then a status field of the communicated work queue element is updated to indicate completion of the communicated work queue element,
wherein the application layer queries the completion queue element to find out if the communicated consumer work request is completed and the verb layer queries the status field of the communicated work queue element to find out if the communicated work queue element is completed,
wherein the work queue elements are stored in a work queue and the completion queue elements are stored in a completion queue such that the work queue and the completion queue elements are located in different address spaces, each independently accessible to the application layer and the verb layer.

2. The method according to claim 1, wherein completion of said work queue elements is indicated in two different ways, a first way capable of querying by the application layer and a second way capable of querying by the verb layer.

3. The method according to claim 2, wherein the first way comprises providing a completion queue element that indicates completion of a particular consumer work request.

4. The method according to claim 2, wherein the second way comprises updating a status field of a particular work queue element to indicate completion of that work queue element.

* * * * *